UNITED STATES PATENT OFFICE.

AMBROSE S. BAKER, OF SANDY CREEK, NEW YORK, ASSIGNOR OF ONE-HALF TO GEORGE J. WOODARD, OF SAME PLACE.

COMPOSITION OF MATTER FOR BRICKS.

SPECIFICATION forming part of Letters Patent No. 477,632, dated June 28, 1892.

Application filed November 12, 1891. Serial No. 411,727. (No specimens.)

*To all whom it may concern:*

Be it known that I, AMBROSE S. BAKER, a citizen of the United States, residing at Sandy Creek, in the county of Oswego and State of New York, have invented a new and useful Brick, of which the following is a specification.

This invention relates to bricks; and it has for its object to provide a composition of matter which when molded together into compact mass to form a brick one will be formed which will harden in a short space of time without the long tedious process of burning and which at the same time will provide a brick which will be quite impervious to water, entirely fire-proof, and, in fact, having all the requisites of high grades or qualities of brick.

With these and other objects in view, which will suggest themselves to those skilled in the art, the invention consists in the combination of the following-named ingredients combined in substantially the proportions specified, to wit: gravel and sand, five parts; Portland cement, one part; iron ore, (dust,) suitable proportion less than one part; salt, (coarse,) suitable proportion less than one part; graphite, suitable proportion less than one part.

The above-named ingredients are thoroughly mixed together in ordinary mechanical admixture and allowed to stand about twenty-four hours, when the brick, which has been molded while the mass is pliable, will be quite hardened and ready for use without the process of burning. Ordinary earth may be substituted for the gravel and sand, being an equivalent of the same, and a composition of brick is thus obtained the ingredients of which are available anywhere.

Having thus described my invention, what I claim, and desire to secure by Letters Patent, is—

A composition of matter for bricks, composed of gravel and sand, Portland cement, pulverized iron ore, salt, and graphite, combined in substantially the proportions specified.

In testimony that I claim the foregoing as my own I have hereto affixed my signature in the presence of two witnesses.

AMBROSE S. BAKER.

Witnesses:
F. H. WILDS,
M. A. WILDS.